United States Patent [19]

Van Der Maaden

[11] 3,807,653

[45] Apr. 30, 1974

[54] LOCKING AND EJECTION DEVICE

[75] Inventor: Johan Van Der Maaden, Emmasingel, Eindhoven, Netherlands

[73] Assignee: U.S. Philips Corporation, New York, N.Y.

[22] Filed: Dec. 29, 1971

[21] Appl. No.: 213,481

[30] Foreign Application Priority Data

Jan. 30, 1971 Netherlands ........................ 7101256

[52] U.S. Cl. ..................... 242/198, 274/4 C, 352/74

[51] Int. Cl.... G03b 1/04, G11b 15/32, G11b 23/04

[58] Field of Search ............................ 242/198–200; 274/4 E–4 G; 352/74

[56] References Cited

UNITED STATES PATENTS

| | | | |
|---|---|---|---|
| 3,604,714 | 9/1971 | Staar | 274/4 E |
| 3,635,423 | 1/1972 | Lennie | 242/198 |
| 3,637,164 | 1/1972 | Trefzger et al. | 242/195 |

*Primary Examiner*—Leonard D. Christian
*Attorney, Agent, or Firm*—Frank R. Trifari

[57] ABSTRACT

Apparatus for recording and/or playing back magnetic recording on and/or from a recording tape accommodated in a cassette, which apparatus contains a cassette loading holder for receiving the cassette which is arranged to move in a direction parallel to itself between an inoperative position and an operative position. In the inoperative position the holder is locked by a pawl construction which is disconnected and releases the holder when the cassette after having reached an extreme inserted position is moved back through a given distance.

8 Claims, 5 Drawing Figures

LOCKING AND EJECTION DEVICE

Figure 1:
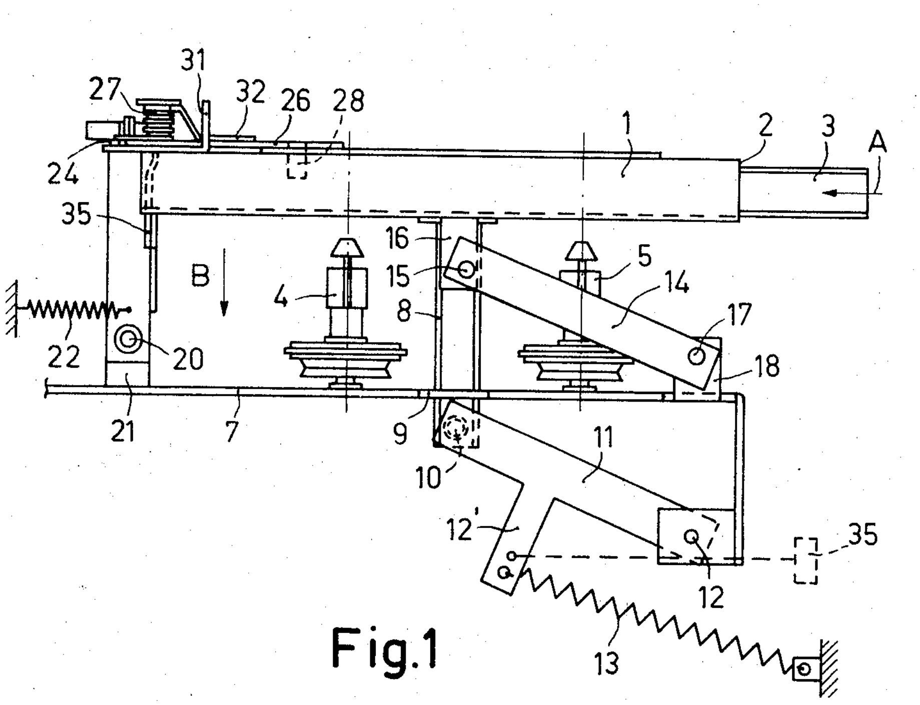

The invention relates to an apparatus for recording and/or playing back magnetic recordings on and/or from a recording tape accommodated in a cassette. In particular the apparatus has a loading holder for receiving the cassette, which holder is provided with an insertion opening and is movable in a direction parallel to itself between an inoperative position in which the cassette can be inserted into the holder through the insertion opening and an operative position in which tape spools provided in the cassette are coupled to driving means of the apparatus. Latch members are provided for holding the loading holder in its inoperative position. Also provided are means for disconnecting the latch members, resilient elements which on disconnection of the latch members move the holder to the operative position, manually operable means which enable the holder to be moved from the operative position to the inoperative position against the action of the resilient elements, and ejection means which on insertion of the cassette are adapted to be displaced by the cassette against a spring force, and locked under spring tension in the operative position of the holder and when the holder is moved from the operative position to the inoperative position are freed and then, under the influence of the spring force acting on the ejection means, push at least part of the cassette from the holder.

An apparatus of this type is described in German Patent Specification No. 1,207,653. In this known apparatus the latch members are in the form of a rod which is horizontally arranged beneath and parallel to the cassette loading holder, is connected to ejection elements disposed in the holder and, when the cassette is inserted into the holder and displaces the ejection elements, follows the movements of these elements whilst being guided in horizontal slots formed in the frame of the apparatus. The means for disconnecting the latch rod comprise vertical slot parts which immediately adjoin the horizontal slots, which the latch rod meets during the insertion movement of the cassette and along which the latch rod is driven downwards under the influence of the resilient elements. Simultaneously the holder containing the cassette is moved to the operative position, this movement being performed comparatively abruptly. In the operative position the ejection elements are locked under spring tension by the latch rod being disposed in the vertical slot parts.

Removing the latching of the cassette loading holder during the insertion movement of the cassette has the disadvantage that the instant at which this latching is removed and the holder containing the cassette is abruptly moved into the operative position cannot be externally perceived by the user of the apparatus, and that the sudden descending movement of the holder takes place at an instant at which the user still is inserting the cassette and his fingers are still pressing against the cassette. As a result the user has the unpleasant feeling that he may jam his fingers.

It is an object of the invention to obviate the said disadvantages and to provide an apparatus the operation of which is more acceptable to the user and in particular is safer.

For this purpose an apparatus of the type described at the beginning of this specification is characterized in that in the inoperative, locked position of the cassette loading holder the ejection means together with the cassette are returnable through a distance which is small compared with the dimensions of the holder, by the spring force acting on these injection means from an extreme position reached when the cassette has been completely inserted, and in that during this return movement the ejection means actuate the means for disconnecting the latch members.

The arrangement according to the invention provides the advantage that the cassette loading holder is unlocked and moved to the operative position at an instant at which the hand of the user is already being retracted and the fingers, which initially during the insertion movement press against the cassette, have already let go of the cassette.

An apparatus according to the invention preferably includes one ejection element which contains the means for disconnecting the latch members.

A suitable embodiment of the invention consists in that the latch members take the form of a latch lever supported in the apparatus which is adapted to pivot in a plane parallel to the direction of insertion and to the direction of movement of the holder and projects through an opening in the holder and is provided with a recess which faces away from the insertion opening of the holder and in the inoperative position of the holder under the influence of a spring force acting on the lever embraces a wall portion of the holder adjoining the holder opening. In this arrangement the ejection element preferably takes the form of a plate-shaped lever which is supported on an outer surface of a wall of the holder and is pivotable about a pin mounted on this wall and is provided with a bent lug which projects into the holder through a slot formed in the said wall and is engaged by a cassette which is being inserted, the ejection element having an inclined abutment part which is bent from the plate-shaped lever and, when the cassette is being inserted into the holder with consequent pivotal movement of the lever, moves along an abutment face of the latch lever, but when the ejection element is returned strikes this abutment face and disconnects the latch lever.

The spring force exerted on the ejection element is preferably supplied by a helically coiled spring which surrounds the pivot pin and permits a deflection movement of the ejection element in a direction at right angles to the pivotal movement.

According to the invention the latch lever is preferably plate-shaped and has a part which is bent over at right angles and an end face of which projects through the holder opening and forms the abutment face for the inclined abutment part of the ejection element, said bent part also forming a locking member for the ejection element in the operative position of the holder. The part of the latch lever which is bent at right angles preferably comprises a lug which is bent out of its plane and is adapted to cooperate with the inclined abutment part of the ejection element and by means of which the contact between the lug of the ejection element and the cassette is broken when the well is being moved into the operative position. When the holder is moved from the operative position to the inoperative position it may be moved beyond the inoperative position, so that the inclined abutment part of the ejection element may be moved beyond the abutment face of the latch lever, the locking of the ejection element being removed, enabling this element to perform the ejection function under the influence of the spring force exerted on it.

Figure 2:
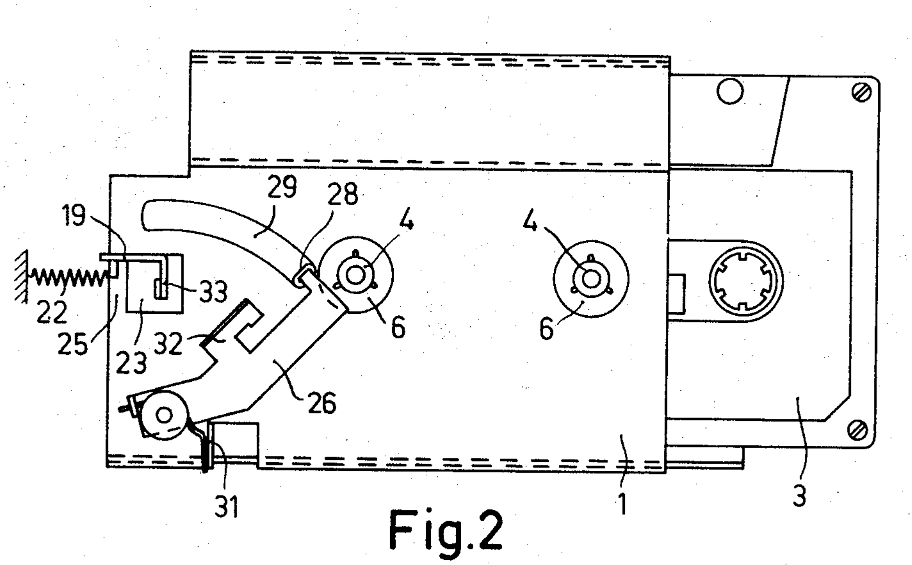
Figure 3:
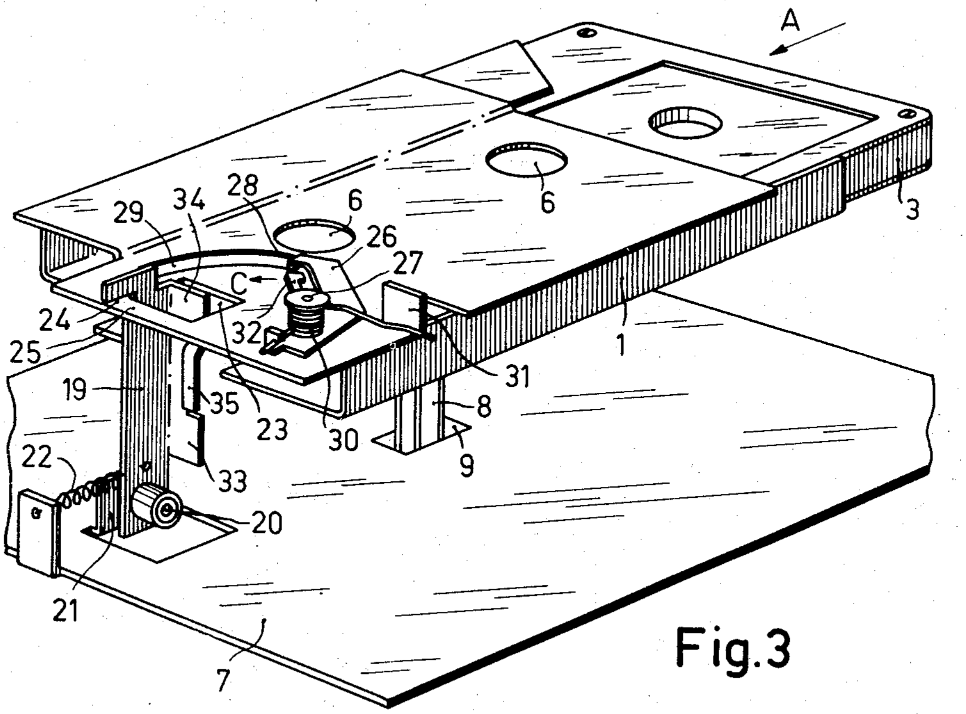
Figure 4:
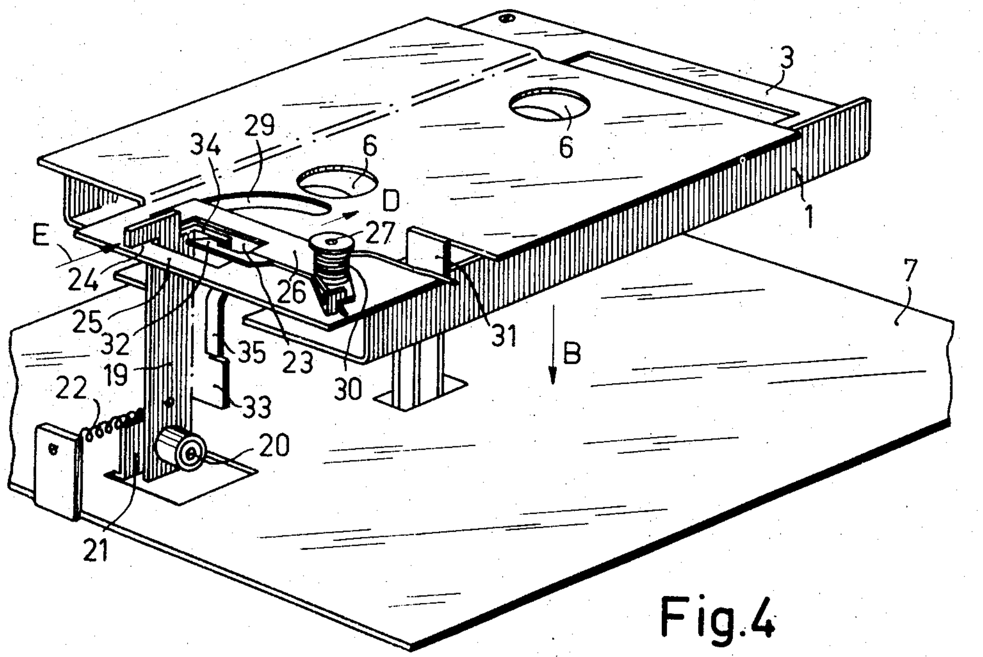
Figure 5:
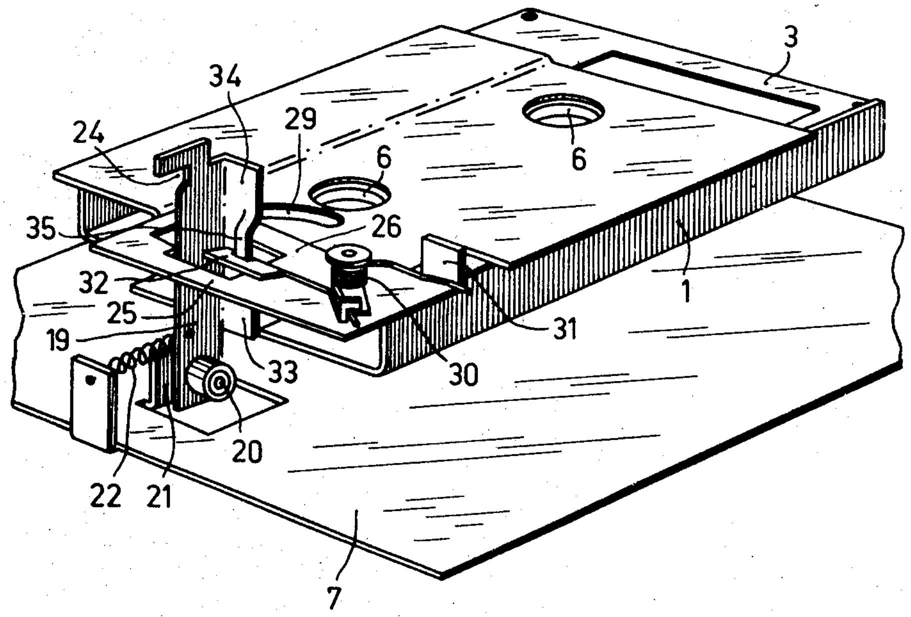

An embodiment of the invention will now be described, by way of example, with reference to the accompanying diagrammatic drawings, in which:

FIG. 1 is a side elevation of part of an apparatus according to the invention showing the cassette loading holder for receiving a cassette in the raised, inoperative position, FIG. 2 is a top plan view of the cassette loading holder of the apparatus shown in FIG. 1, FIG. 3 is a perspective view of the cassette loading holder in the inoperative position during the insertion of a cassette, FIG. 4 is a perspective view similar to FIG. 3, showing the holder in the inoperative position immediately before the instant at which, after the cassette has been completely inserted, the locking of the holder is removed, and FIG. 5 is a perspective view of the holder shown in FIG. 3 and 4 when it has reached the operative position after removal of the locking.

Only those component parts of the apparatus according to the invention for recording and/or playing back magnetic recordings are shown in the drawings which are essential to the invention and/or are required for a better understanding thereof.

Referring now to the Figures, the apparatus according to the invention has a cassette loading holder 1 into which a cassette 3 may be inserted through a lateral opening 2. The cassette, which may be of a known type containing two winding hubs and a magnetic recording tape, does not form part of the invention and is not described in greater detail. The holder 1 is adapted to be moved parallel to itself between a raised, inoperative position shown in FIGS. 1, 2, 3 and 4, in which position the cassette 3 can be inserted, and an operative position in which the hubs provided in the cassette are coupled to known tape driving means in the form of spindles 4 and 5 which are mounted in a plate-shaped frame 7 of the apparatus and in the operative position project through openings 6 in the holder into bores in the hubs. The operative position of the holder is shown in FIG. 5.

To obtain the said movement the holder 1 is secured to a central column 8 of U-shaped cross-section which passes through an opening 9 in the frame 7. The end of the column 8 projecting beneath the frame 7 is pivotably connected by means of a hinge pin 10 to one end of a lever 11 the other end of which is pivotably connected to the frame at 12. The lever is T-shaped and has a limb 12' to the free end of which is connected one end of a helically coiled tension spring 13 the other end of which is rigidly secured to the frame. The spring 13 tends to pivot the lever 11 with respect to the pin 12 in a counterclockwise direction viewed in FIG. 1 so as to move the holder downwards into the operative position. In the inoperative position shown in FIG. 1, however, the holder is locked, as will be described more fully hereinafter. The movement of the holder is guided by means of two arms 14 which, viewed in FIG. 1, are arranged one behind the other on either side of the column 8. Each arm 14 is pivotable at one end about a pin 15 mounted in a downwardly extending lug 16 of the holder and at the other end about a pin 17 secured in a bent-over part 18 of the frame plate 7.

In the inoperative position the holder 1 is locked by means of a latch lever 19 which is pivotably supported by a pin 20 mounted in a lug 21 bent from the plate 7. The lever 19, which is made of sheet material, is pivotable in a plane parallel to the direction of insertion A of the cassette and to the direction of movement B of the holder and is loaded by a spring 22 which is connected at one end to the lever and at the other end to a fixed point in the apparatus and which tends to pivot the lever 19 counterclockwise, viewed in FIG. 1. The latch lever 19 projects through an opening 23 formed in the holder and is provided with a recess 24 facing away from the insertion opening 2 in the holder. In the inoperative position of the holder a recess 24 in the latch lever 19 embraces a wall portion 25 of the holder adjoining the opening 23. The latch lever 19 has a part 33 which is bent over at right angles and an end face 34 of which, which projects through the opening in the holder, forms an abutment face capable of cooperating with an ejection element 26 which will now be described in detail.

The ejection element 16 comprises a plateshaped lever which externally of the holder is horizontally pivotably supported by a pin 27 provided on the well. The ejection lever 26 has a lug 28 bent over at right angles which projects into the holder through an opening 29 formed in the upper wall of the holder and is engaged by a cassette which is being inserted, as will be described more fully hereinafter. The pivot pin 27 of the ejection lever 26 is encircled by a helically coiled spring 30 one end of which is connected to the ejection lever and the other end of which bears against an upright lug 31 of the holder and which permits an elastic deflection movement of the ejection lever 26 in a direction at right angles to the horizontal pivotal movement. The ejection lever 26 further comprises an inclined abutment part 32 which is bent from the plane of the plate-shaped lever and is adapted to cooperate with the bent-over part 33 of the latch lever 19, as will be described more fully hereinafter.

The operation of the arrangement is as follows: in the inoperative position of the holder 1 (FIGS. 1, 2, 3 and 4) the holder is locked because the recess 24 in the latch lever 19 embraces the part 25 of the wall of the holder. When, as FIG. 3 shows, a cassette 3 is inserted into the holder in the direction indicated by the arrow A, the cassette will strike the lug 28 of the ejection lever 26 and then push back this lever in the direction indicated by an arrow C against the action of the spring 30. During this pivotal movement of the ejection lever 26 the inclined abutment part 32 will run over the abutment face 34 of the latch lever 19, because the ejection lever is capable of elastic deflection in a direction at right angles to the pivotal movement. When the cassette has been completely inserted the condition shown in FIG. 4 has been reached. The user now lets go of the cassette, whereupon the ejection lever 26 under the action of the energy stored in the spring 30 moves back together with the cassette in the direction indicated by an arrow D. During this return movement the abutment part 32 of the ejection lever 26 strikes the abutment face 34 of the latch lever 19, so that this lever is pivoted in the direction indicated by an arrow E against the action of the spring 22, the locking of the holder is removed and the holder under the influence of its own weight, of the weight of the cassette and by the action of the spring 13 is moved downwards into the operative position shown in FIG. 5. In the embodiment shown the part 33 of the latch lever 19, which part is bent over at right angles, is provided with a lug 35 bent from the plane of the part 33 in order to break the contact between the lug 28 of the ejection lever 26 and the cassette during the downward movement of the holder containing the cassette, so that the positioning of the cassette in the operative position is not influenced by the force of the spring 30 exerted on the ejection lever. When the holder is to be returned to the inoperative or initial position, a known ejection key 36 (FIG. 1) is operated so as to pivot the lever 11 clockwise with respect to the pin 12 against the action of the spring 13, so that the column 8 together with the holder 1 is raised. The extent of this raising movement is selected so that the holder is raised to a position slightly beyond the inoperative position, enabling the inclined abutment part 32 of the ejection lever 26 to pass along the abutment face 34 of the latch lever 19 under the action of the spring 30 and enabling the ejection lever to push at least part of the cassette from the holder. The latch lever 19 now is free to restore the locking of the holder under the influence of the tension of the spring 22.

What is claimed is:

1. Apparatus for recording and/or playing back magnetic recordings on and/or from a recording tape accommodated in a cassette, comprising a loading holder having an insertion opening for receiving the cassette, said holder mounted on said apparatus for movement in a direction parallel to itself between an inoperative position in which the cassette can be inserted in the holder through the insertion opening and an operative position in which tape spools provided in the cassette are coupled to driving means of the apparatus, latch members carried by said apparatus for holding the loading holder in its inoperative position, means for disconnecting the latch members so as to release said holder from the inoperative position, resilient elements connected to said holder for moving said holder to the operative position on disconnection of the latch members, manually operable means for moving the holder from the operative position to the inoperative position against the action of the resilient elements, ejection means adapted for displacement in one direction by the cassette upon insertion of the cassette into said holder, biasing means for urging said ejection means in the opposite direction of insertion of the cassette, locking means for locking said ejection means from displacement in said opposite direction when said holder is in the operative position and for freeing said ejection means for movement in said opposite direction when the holder is moved from the operative position to the inoperative position, so that under the influence of said biasing means acting on the ejection means the cassette is at least partially ejected from the holder, and a spring acting on said ejection means for return movement of said ejection means and said cassette carried by the holder when said holder is locked in the inoperative position from an extreme position reached when the cassette has been completely inserted through a distance which is small compared with the dimensions of the holder in a direction opposite to that of insertion, during said return movement the ejection means actuates said means for disconnecting the latch members.

2. Apparatus as claimed in claim 1, wherein the means for disconnecting the latch members is provided on said ejection element.

3. Apparatus for recording and/or playing back magnetic recordings on and/or from a recording tape accommodated in a cassette, comprising a loading holder having an insertion opening for receiving the cassette, said holder mounted on said apparatus for movement in a direction parallel to itself between an inoperative position in which the cassette can be inserted in the holder through the insertion opening and an operative position in which tape spools provided in the cassette are coupled to driving means of the apparatus, latch members carried by said apparatus for holding the loading holder in its inoperative position, means for disconnecting the latch members so as to release said holder from the inoperative position, resilient elements connected to said holder for moving said holder to the operative position on disconnection of the latch members, manually operable means for moving the holder from the operative position to the inoperative position against the action of the resilient elements, ejection means adapted for displacement in one direction by the cassette upon insertion of the cassette into said holder, biasing means for urging said ejection means in the opposite direction of insertion of the cassette, locking means for locking said ejection means from displacement in said opposite direction when said holder is in the operative position and for freeing said ejection means for movement in said opposite direction when the holder is moved from the operative position to the inoperative position, so that under the influence of said biasing means acting on the ejection means the cassette is at least partially ejected from the holder, and a spring acting on said ejection means for return movement of said ejection means and said cassette carried by the holder when said holder is locked in the inoperative position from an extreme position reached when the cassette has been completely inserted through a distance which is snall compared with the dimensions of the holder in a direction opposite to that of insertion during said return movement the ejection means actuates said means for disconnecting the latch members, said latch members comprising a latch lever supported in the apparatus, said lever being mounted for pivotal movement in a plane parallel to the direction of insertion of the cassette and to the direction of movement of the holder, said lever projecting through an opening in the holder, and a recess provided in said lever facing away from the insertion opening in the holder, said recess engaging a wall portion of the holder adjoining the holder opening when said holder is in the operative position, and spring means for urging said lever in a direction so that said recess will engage said wall portion.

4. Apparatus as claimed in claim 3, wherein said ejection element comprises a plate-shaped lever supported on the outer surface of a wall of the holder, a pivot pin mounted on said wall for supporting said element for pivotal movement, a bent lug carried by said element, a slot (29) formed in said wall of said holder through which said bent lug projects for engagement by a cassette being inserted, an inclined abutment part bent from the plate-shaped lever of said ejection element for running over an abutment face said latch lever when the cassette is being inserted into the holder with consequent pivotal movement of the lever, said inclined abutment part striking said abutment face for disconnecting said latch lever when said ejection element returns.

5. Apparatus as claimed in claim 4, wherein said spring acting on said ejection means is a helically coiled spring surrounding said pivot pin permitting a deflection movement of the ejection element in a direction at right angles to the pivotal movement.

6. Apparatus as claimed in claim 4 wherein said latch lever is plate-shaped and further comprises a bent over part at right angles to the plate and an end face of which projects through the holder opening forming the abutment face for the inclined abutment part of the ejection element, said bent over part forms a locking member for the ejection element when the holder is in the operative position.

7. Apparatus as claimed in claim 6, wherein said bent over part of the latch lever comprises a lug bent out of its plane adapted to cooperate with the inclined abutment part of the ejection element, so that when the holder is being moved into the operative position contact between said bent lug of the ejection element and the cassette is broken.

8. Apparatus as claimed in claim 6 characterized in that when the holder is moved from the operative position to the inoperative position it may be moved beyond the inoperative position and hence the inclined abutment part of the ejection element may be moved beyond the abutment face of the latch lever, the locking of the ejection element being removed, enabling this element to perform its ejection function under the influence of the spring force exerted on it.

* * * * *

PO-1050
(5/69)

UNITED STATES PATENT OFFICE
CERTIFICATE OF CORRECTION

Patent No. 3,807,653 Dated April 30, 1974

Inventor(s) JOHAN VAN DER MAADEN

It is certified that error appears in the above-identified patent and that said Letters Patent are hereby corrected as shown below:

Column 6, line 60, Cancel "(29)"

Column 6, line 63, after "face" insert --of--

IN THE TITLE

CHANGE TITLE TO --TAPE CASSETTE LOCKING AND EJECTION DEVICE--

Signed and sealed this 31st day of December 1974.

(SEAL)
Attest:

McCOY M. GIBSON JR.
Attesting Officer

C. MARSHALL DANN
Commissioner of Patents

UNITED STATES PATENT OFFICE

CERTIFICATE OF CORRECTION

Patent No. 3,807,653 Dated April 30, 1974

Inventor(s) Johan Van Der Maaden

It is certified that error appears in the above-identified patent and that said Letters Patent are hereby corrected as shown below:

Column 6, line 61, cancel "(29)"; line 64, after "face" insert -- of --.

Signed and Sealed this

*thirtieth* Day of *December 1975*

[SEAL]

*Attest:*

RUTH C. MASON
*Attesting Officer*

C. MARSHALL DANN
*Commissioner of Patents and Trademarks*